UNITED STATES PATENT OFFICE.

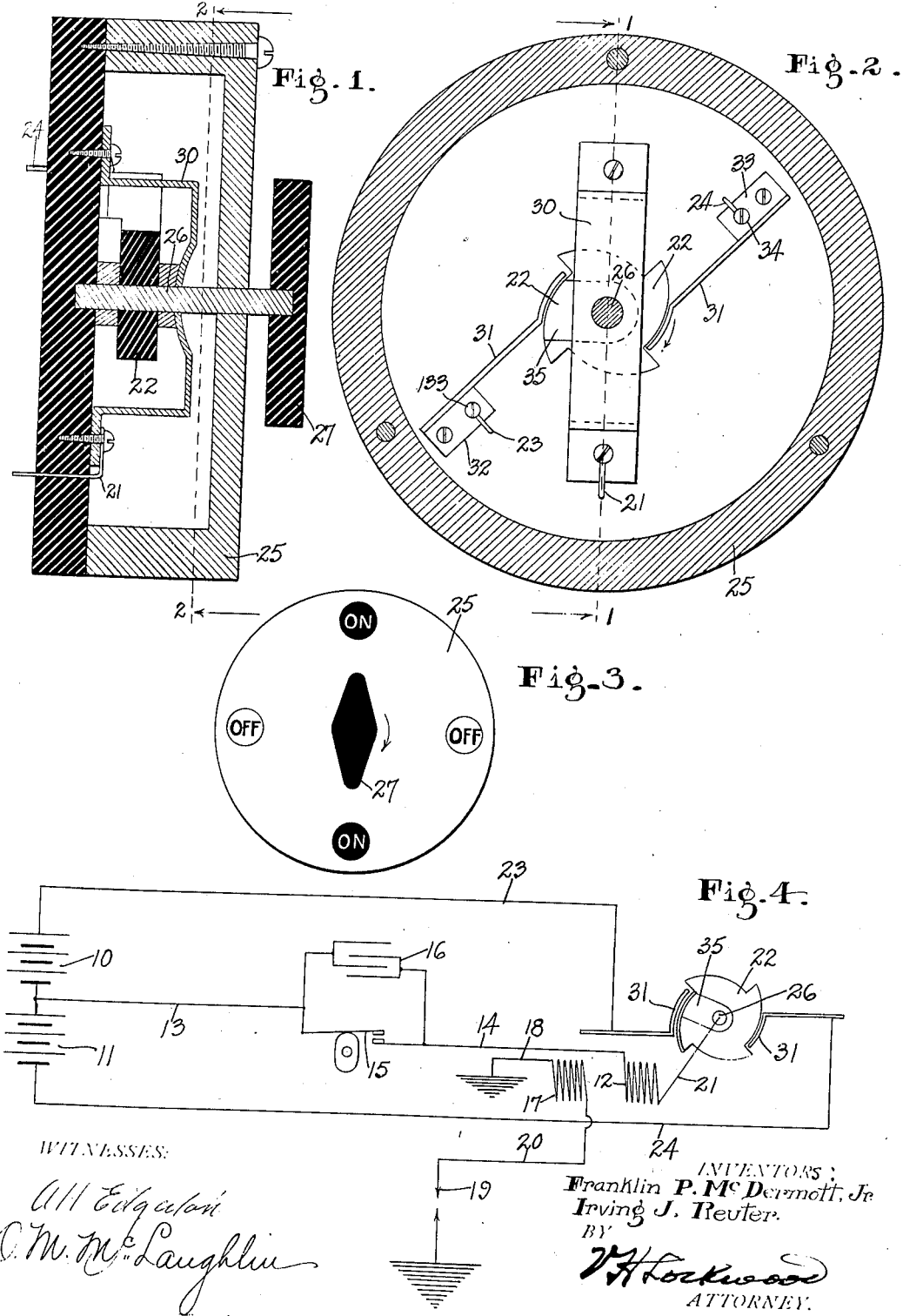

IRVING J. REUTER AND FRANKLIN P. McDERMOTT, JR., OF ANDERSON, INDIANA, ASSIGNORS TO REMY ELECTRIC COMPANY, OF ANDERSON, INDIANA, A CORPORATION.

SYSTEM OF DISTRIBUTING ELECTRIC ENERGY.

1,064,541.  Specification of Letters Patent. Patented June 10, 1913.

Application filed April 4, 1912. Serial No. 688,529.

*To all whom it may concern:*

Be it known that we, IRVING J. REUTER and FRANKLIN P. McDERMOTT, Jr., citizens of the United States, and residents of Anderson, county of Madison, and State of Indiana, have invented a certain useful System of Distributing Electric Energy; and we do hereby declare that the following is a full, clear, and exact description thereof, reference being had to the accompanying drawings.

The object of this invention is to provide a system of supplying to a current consuming means or device electric energy in substantially equal amounts in each direction and from a plurality of sources an equal number of times, or in succession, one source of such energy being turned off at the time another is turned on. Hence, the amount of electric energy passing through the current consuming device in each direction will always be equal, whether there be a plurality of sources of electric energy or not.

To that end any switch, or the like, may be employed between the source or sources of electric energy in the current consuming device, if its construction is such that when actuated it will reverse the current and cause substantially equal amounts of electricity to pass through the current consuming device before each reversal. Also, when a plurality of sources of current is employed, when the switch is disconnected from one source, it cannot be connected with that source of current until it has been connected with the other source or sources of current successively, and disconnects one source of current before connecting another source of current with the current consuming device. With this sort of switch it is observed that the burden of supplying the current will be all divided or distributed among the sources of current successively and equally so that no one source will be drained any more than another source of current. This renders the invention of great value in certain situations. Each of the different sources of electric energy supplies substantially the same amount of electric energy to the current consuming device, and substantially equal amounts of current may pass through the current consuming device in each direction.

The nature of the invention will be understood from the accompanying drawings and the following description and claims.

In the drawings, Figure 1 is a central peripheral section of the switch mechanism. Fig. 2 is a horizontal section thereof on the line 2—2 of Fig. 1. Fig. 3 is an elevation of the switch. Fig. 4 is a diagram of the connections.

The invention is brought out particularly in Fig. 4. There are two sets of batteries 10 and 11 shown to represent a plurality of sources of electric energy, but the number of batteries may be increased, or a plurality of some other sort of source of electric energy be used instead of batteries. The current consuming device herein shown is an ignition system, the primary winding 12 of the induction coil of which is connected with both batteries 10 and 11 by the lines 13 and 14. In this line there is a circuit breaker 15 and condenser 16. The secondary winding 17 is connected by the line 18 to ground and also with the spark plug 19 by a line 20. This shows an ignition system, although the invention is not limited to any particular sort of current consuming device. The primary winding 12 of the ignition system is connected with the other poles of the two batteries by a line 21 running to a switch 22 and therefrom through lines 23 and 24. The switch alternately connects said batteries with said primary winding and turns one off before turning the other on alternately and successively, and it cannot turn on the same battery twice in succession, and the current consuming device, therefore, draws equally from the two batteries, that is, during any period of operation it is connected with the two batteries an equal number of times. The detail of the switch herein shown will now be explained. It is provided with a casing 25 and within the casing there is the switch disk 22 secured on a shaft 26 which is mounted centrally in the casing, and one end extends outside the casing and carries a finger piece 27 whereby the switch is turned by hand in the direction indicated by the arrow. Within the casing 25 there is also a metal plate 30 secured for mounting the shaft 26, and the switch disk 22 is a disk with four projecting segments, each constituting ninety degrees or one-fourth of the circumference of the disk, and the notches between the segments show that the switch can not turn backward because of the spring contacts 31, which press against the periphery of the segmental extensions of the switch. Said springs are secured to blocks 32 and 33, which have binding posts 133 and 34, to which the lines 23 and 24 are connected. The body of the switch disk 22 is formed of hard rubber or other insulating material, and a metal stirrup or plate 35 is secured to the shaft 26 and overlaps a part of one of the segments of the switch disk 22, so that when one of the spring contacts 31 engages the stirrup 35 during the revolution of the switch, the circuit will be closed between the ignition system and one of the batteries, and when the other spring contact subsequently engages the plate 35, the ignition system is connected with the other battery. Therefore, during one-fourth of the revolution of the switch, the ignition system is connected with one battery. During the next fourth of the revolution of the switch the ignition system of the switch is connected with neither battery; during the next fourth with the other battery, and during the last fourth of the revolution, it is connected with neither battery. The springs 31 prevent the backward movement of the switch, hence the switch can be moved only in one direction, the forward direction. The operator never has to think of the direction in which he has to move the switch, because it is movable in only one direction and, when he moves the switch, it will bring the current consuming device into connection with the battery with which it was not last connected. In other words, it enforces an alternate use of the batteries, and divides the drain or burden upon the batteries between the two batteries, and this result is automatic, that is, it necessarily results from the operation of the switch. Hence the batteries or sources of electrical energy are utilized an equal number of times.

The invention is not limited to any particular switch, the one which is here shown being only one which might be used. But the switch must be such that it can not move backwardly or moved to connect the current consuming device with any one of the sources of electric energy a greater number of times than with the other source of electric energy.

Referring again to the battery connections, it will be seen that the positive pole of one set of batteries and the negative pole of the other set are connected to one terminal of the induction coil through the lines 13 and 14. The other terminal of said primary coil may be connected to the other pole of either battery through the switch 22. Thus the direction of the flow of current is reversed with each successive battery connection by the switch 22.

It has been found by practice that the life of the circuit breaker contact points is materially lengthened by reversing the direction of the flow of current across them, and when the switch is continuously operated, substantially equal amounts of electricity pass through the current consuming device in each direction.

We claim as our invention:

1. A source of electric energy, a current consuming means electrically connected therewith, and a switch for starting and stopping the flow of current through said current consuming means according to whether it is desired to have said current consuming means in operation or not and arranged to reverse the direction of current through the current consuming means each time that the current is started by said switch.

2. A source of electric energy, a current consuming means, and a switch for starting and stopping the flow of current through said current consuming means according to whether it is desired to have said current consuming means in operation or not, said switch being connected with the positive and negative poles of the source of electric energy and arranged for starting the flow of current through said current consuming means in different directions a substantially equal number of times.

3. A source of electric energy, a current consuming means, and a switch for starting and stopping the flow of current through said current consuming means, said switch having a plurality of positive connections and a plurality of negative connections with the source of electric energy and arranged for reversing the direction of current through the current consuming means each time that the current is started by said switch.

4. A plurality of sources of electric energy, a current consuming means, a switch for connecting said current consuming means successively with each source of electric energy, and means for preventing said switch from connecting one source of electric energy with the current consuming means until it has been connected with the other sources or sources of electric energy.

5. A plurality of sources of electric energy, a current consuming means, the positive pole of one of said sources of electric energy and the negative pole of another source of electric energy being connected to one terminal of said current consuming means, a switch connected with the other terminal of the current consuming means and adapted to electrically connect said last-mentioned terminal of the current consuming means with the other terminals of said sources of electric energy, and means for preventing the switch from connecting the current consuming means with one source of electric energy until it has connected it with the other sources of electricity in succession.

6. A plurality of sources of electric energy, a current consuming means, the positive pole of one of said sources of electric energy and the negative pole of another source of electric energy being connected to one terminal of said current consuming means, a switch connected with the other terminal of said current consuming means and adapted to connect the same successively with the other terminals of said sources of electric energy, said switch having in each cycle of movement thereof one "on" position for each source of electric energy and an intermediate "off" position between each two "on" positions, and means for preventing backward movement of the switch between any two "on" positions.

In witness whereof, we have hereunto affixed our signatures in the presence of the witnesses herein named.

IRVING J. REUTER.
FRANKLIN P. McDERMOTT, Jr.

Witnesses:
　WALTER E. MIZE,
　RANDALL I. VAN WINKLE.